(12) United States Patent
Goh et al.

(10) Patent No.: US 7,269,645 B2
(45) Date of Patent: Sep. 11, 2007

(54) SEAMLESS MIGRATION OF ONE OR MORE BUSINESS PROCESSES AND THEIR WORK ENVIRONMENT BETWEEN COMPUTING DEVICES AND A NETWORK

(75) Inventors: SweeFen Goh, Hartsdale, NY (US); Jakka Sairamesh, New York, NY (US); Ioana Stanoi, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 756 days.

(21) Appl. No.: 10/699,578

(22) Filed: Oct. 31, 2003

(65) Prior Publication Data

US 2005/0096968 A1    May 5, 2005

(51) Int. Cl.
G06F 15/173    (2006.01)
G06F 15/16     (2006.01)

(52) U.S. Cl. ............... 709/223; 709/202; 709/224; 709/227; 714/4; 719/318

(58) Field of Classification Search ........ 709/202–203, 709/223–224, 227–229; 719/318–320; 705/1; 714/4–5, 47
See application file for complete search history.

(56) References Cited

U.S. PATENT DOCUMENTS

| | | | |
|---|---|---|---|
| 5,790,788 A * | 8/1998 | Badovinatz et al. ........ | 709/201 |
| 6,154,849 A * | 11/2000 | Xia ............................... | 714/4 |
| 6,401,119 B1 * | 6/2002 | Fuss et al. .................. | 709/224 |
| 6,662,355 B1 * | 12/2003 | Caswell et al. ................ | 705/1 |
| 6,725,281 B1 * | 4/2004 | Zintel et al. ................ | 719/318 |
| 6,754,843 B1 * | 6/2004 | Lu et al. ........................ | 714/4 |
| 6,888,792 B2 * | 5/2005 | Gronke ....................... | 709/239 |
| 6,934,755 B1 * | 8/2005 | Saulpaugh et al. ......... | 709/226 |
| 7,047,291 B2 * | 5/2006 | Breese et al. ............... | 709/223 |
| 7,065,566 B2 * | 6/2006 | Menard et al. ............. | 709/223 |
| 7,100,074 B2 * | 8/2006 | Watanabe et al. .............. | 714/9 |
| 7,139,925 B2 * | 11/2006 | Dinker et al. ............... | 709/223 |

OTHER PUBLICATIONS

Durlacher Research Ltd. "Mobile Commerce Report", Feb. 2000.
J. Sairamesh et al., "A Platform for Sell-side private exchanges", IBM Systems Journal, May 2002 (Sairamesh 1).
Margaret H. Dunham et al., "A Mobile Transaction ModelThat Captures Both the Data and Movement Behavior," MONET 2(2): 149-162 (1997).
J. Sairamesh et al., "Wireless B2B Trading", proceedings of the First ACM Workshop on Mobile Commerce, (conjunction with Mobicom, 2001) (Sairamesh 2).

(Continued)

Primary Examiner—Bharat Barot
(74) Attorney, Agent, or Firm—Rafael Perez-Pineiro, Esq.

(57) ABSTRACT

A mechanism for end-to-end mobile e-business applications for migration of business processes and business context between two or more clients and servers to provide transparency and reliability given unreliable networks and systems is disclosed. The e-business applications include mobile purchasing, retail point of sales, and inventory replenishment. The design of the novel mechanism takes into consideration migration of business processes and business context between clients and servers making the business activities transparent to the user of the mobile clients or networked clients.

10 Claims, 2 Drawing Sheets

Migration State-Machine

OTHER PUBLICATIONS

Dhiraj K. Pradhan et al., "Recoverable Mobile Environment: Design and Trade-Off Analysis," International Symposium on Fault-Tolerant Computing (FTCS) 1996: 16-25.

A. Tsalgatidou et al., "Challenges in Mobile Electronic Commerce", proceedings of the IeC 2000, 3$^{rd}$ Int. Conf. On Innovation through E-commerce. Manchester, UK, Nov. 14-16, 2000.

Peter Muth et al., "From Centralized Workflow Specification to Distributed Workflow Execution," Journal of Intelligent Information Systems, 10(2): 159-184 (1998).

D. Georgakopoulos et al., "An Overview of Workflow Management: From Process Modeling to Workflow Automation Infrastructure", Journal of Parallel and Distributed Systems, 1995.

G. Alonso et al., "Exotica/FMDC: A Workflow Management System for Mobile and Disconnected Clients," Journal of Distributed and Parallel Databases, 1996.

A. Jhingran, "Moving up the food chain: Supporting E-Commerce Applications on Databases," SIGMOD Record 29(4): 50-54 (2000).

Douglas B. Terry et al., "Managing Update Conflicts in Bayou, a Weakly Connected Replicated Storage System," Symposium on Operating Systems Principles (SOSP) 1995: 172-183.

Brian Noble et al., "Agile Application-Aware Adaptation for Mobility," Symposium on Operating Systems Principles (SOSP) 1997: 276-287.

Prabhu Ram et al., "Distributed Transactions in Practice," SIGMOD Record, 1999.

* cited by examiner

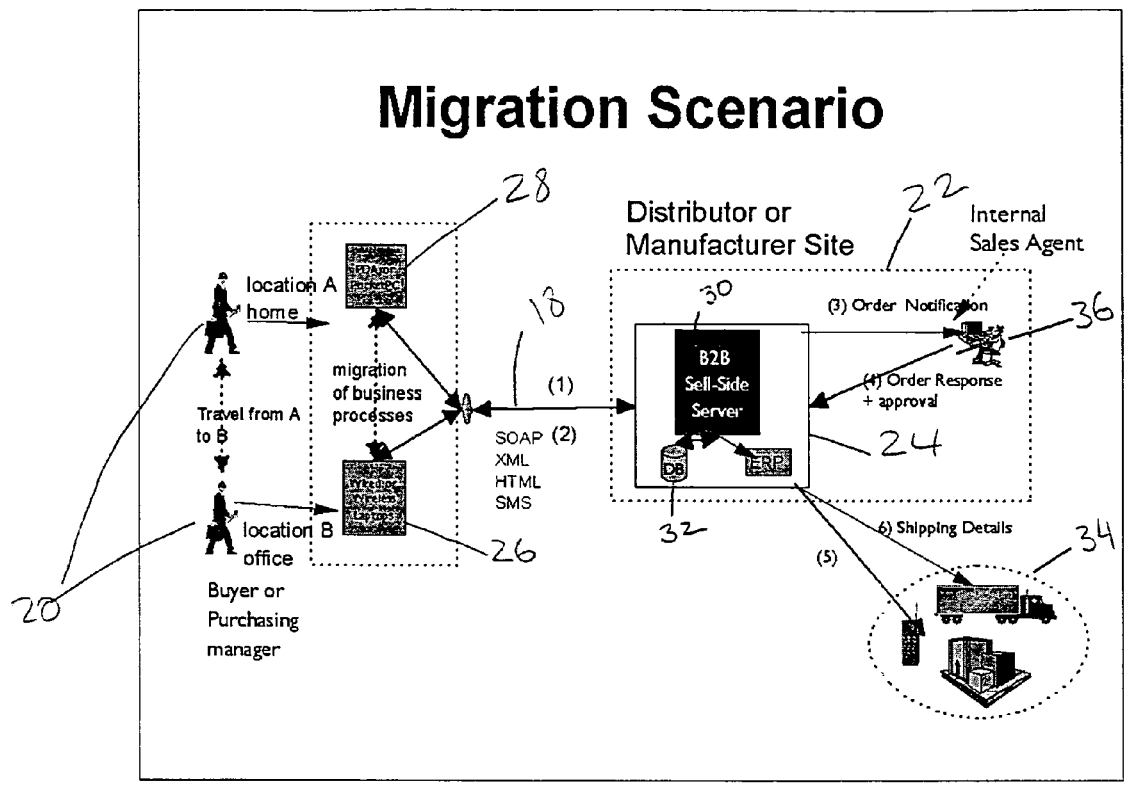
Figure 1: Purchasing Scenario

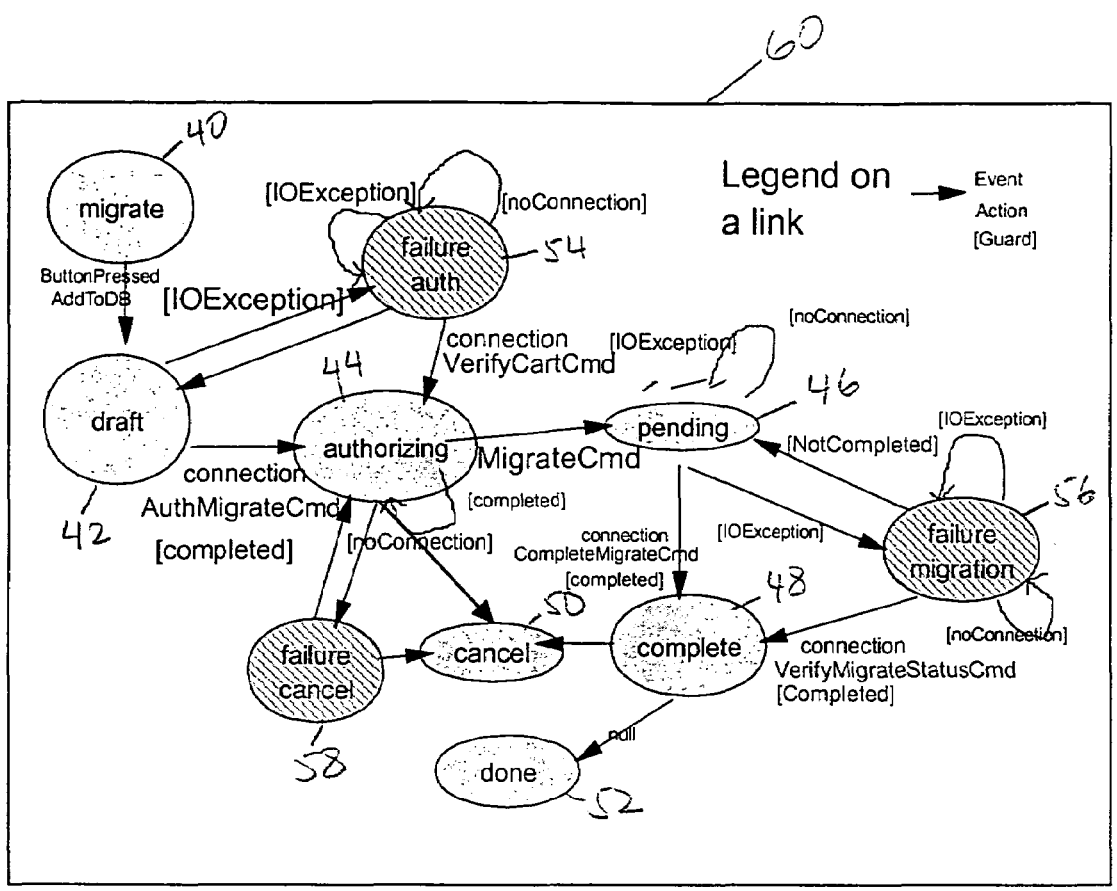
Figure 2: Migration State-Machine

SEAMLESS MIGRATION OF ONE OR MORE BUSINESS PROCESSES AND THEIR WORK ENVIRONMENT BETWEEN COMPUTING DEVICES AND A NETWORK

BACKGROUND OF THE INVENTION

1. Field of the Invention

The invention relates to a system for mobile e-business on client devices such as, personal digital assistants (PDAs), Pocket PCs, etc., integrated with private exchanges and sell-side servers and more specifically to an e-business framework on mobile clients, where the control mechanism handles migration of business processes based on events such as a user and migration conditions and search for appropriate clients and servers that are available for migrating the business processes.

2. Description of Related Art

With advances in computing and communication capabilities of hand-held devices such as personal digital assistants (PDAs), Pocket PCs, wireless enabled laptop computers, cell phones and other such computing devices, an emergence of a variety of applications in mobile e-business (m-business) is being seen. These mobile devices are becoming as powerful as desktop personal computers (PCs), thereby attracting consumers and businesses to use them in daily business and recreational activities. The mobile e-business is considered to be a major business opportunity area in the coming years. Currently various groups and companies are experimenting with mobile applications in order to validate the possibility of using these devices for all kinds of core business activities.

Given the falling costs, increasing computational power and ease of use of, the market for mobile phones and hand-held devices is exploding. According to Durlacher Research Ltd. "Mobile Commerce Report", February, 2000, the current estimate of a number of devices sold is around 500 million and growing to a billion in the next couple of years. In contrast, according to that report and J. Sairamesh et al., "A Platform for Sell-side private exchanges", IBM Systems Journal, May 2002 (Sairamesh 1), the number of desktop PCs has saturated to around 500 million. Most mobile users will at some point in the future have more than one mobile device and will increasingly depend on these devices for accessing the Internet and performing daily activities. For businesses, still according to the "Mobile Commerce Report", Sairamesh 1, and P. Timmers, "Electronic Commerce: Strategies and Models for B2B Trading," Wiley, 1999, low costs and increased capacity provides a tremendous opportunity to exploit these mobile devices for routine business to business (B2B) activities, such as purchasing, point of sale, inventory tracking, order status and order notifications, warehouse management, and others.

What drives this explosion, are factors including reduction in cost, improved computing capabilities, transparency, and reliability. Economics is playing a role in bringing low cost computing to the consumer, whether a business or an individual, who can easily access the Internet through a mobile device. Internet enabled mobile devices are gaining popularity as the costs of subscription to wireless Internet services are getting lower, as shown by the "Mobile Commerce Report", J. Sairamesh et al., "Wireless B2B Trading", proceedings of the First ACM Workshop on Mobile Commerce, (conjunction with Mobicom, 2001) (Sairamesh 2), and Margaret H. Dunham et al., "A Mobile Transaction Model That Captures Both the Data and Movement Behavior," MONET 2(2): 149-162 (1997).

The increasing computing power and storage in the hand-held devices, makes such devices almost as powerful as desktop PC of some years back. Most of the hand-held devices, such as Palm Pilot and PocketPC devices, offer memory in a range of 16 to 256 Mega bytes, which is large enough to handle common operating systems, small footprint databases, web-browsers, and other applications. Some of the devices support 200 to 400 MHz of processing capacity, which is very powerful by today's standards and able to run complex applications.

Mobile business users usually own one or more wired and wireless devices, e.g., PCs, laptops, and increasingly using these devices for business activities either at home or office. In essence, users would prefer to have seamless access to business information and business critical processes through every device. This is becoming increasingly important for business employees, who are mobile and own multiple handheld devices, to access their intranets. With multiple devices owned and used by business users, information and processes can be migrated from device to device for better reliability. A further factor has been in providing reliability of critical business information, and processes.

Some real business scenarios for mobile e-business applications in retail and wholesale distribution based on common customer requirements for their sales and purchasing departments are presented below with reference to FIG. 1. As an example, consider a purchasing manager 20 of a car dealership checking an inventory of tires (not shown) in his dealership. The manager finds that the inventory of tires from the manufacturer X is low, and wishes to place an order to a distributor 22 of those tires. Assuming that the manager 20 or his dealership are registered at the distributor's website 24. The manager logs-in or connects through an office computer 26 at the dealership to the distributor's website 24 supported on one or more computing devices or servers 30. The server 30 may include various databases 32 of catalogs and an enterprise resource planning (ERP) subsystem 34 for providing stock and order shipping details gathered from factories, storehouses, and trucks 34. Server 30 may be further connected to an order notification system 36 operated automatically or by an internal sales agent of the distributor for the purpose of verifying received customer orders and providing order response and approval.

The manager 20 searches for and, when found, retrieves from the server 30 and its databases 32 a part of the distributor's catalog on tires, such catalog may include, for example price and availability information. Accordingly, a copy of the retrieved distributor catalog is now stored on the manager's office computing device 26. The purchasing manager 20 browses the catalog locally, i.e., on the computing device 26, and adds items to a shopping cart on the database of that device 26. By the end of the day, the purchasing manager 20 may create a few "pending" shopping lists, and place the rest for order.

After work the purchasing manager 20 travels home, where (s)he wishes to continue working on the order placement of the pending shopping lists. What is required for this is for the work computing device 26 to automatically contact the home computing device 28 and for the business processes and business context, i.e., the downloaded catalogs and the shopping list, to migrate from the work computer 26 to the home computer 28. The purchasing manager 20 can then continue performing unfinished business processes in a seamless, transparent manner on the second computing device.

The scenario described above may be spoiled or prevented by failures that can occur during any stage of the migration process. In the above scenario it was assumed that when the migration of the business processes and context was taking place between the manager's two computing devices 26-28, one at work and the other at home, the devices were in connected mode. If the devices are connected to the network 18, the migration takes place smoothly. If during the migration, there is a disconnect from the network 18, then the computing device at work monitors the disconnection and waits for connectivity to be established for migration to continue.

The disconnect can occur during any stage of the purchasing process due to many reasons including network time-out or network failure, low battery, local memory constraints and other system failures. For example, the mobile device may be disconnected from the network when retrieving catalog entries from the server 30 or when trying to send a completed order to the distributor server 30. In addition the communication network could be slow enough to cause a time-out at the client side, causing disconnection.

What is needed is a method to seamlessly migrate one or more business processes, objects, and their work environment between a plurality of computing devices belonging to a user and a server.

SUMMARY OF THE INVENTION

The present invention discloses a method for seamless migration of one or more business processes and their work environment between a plurality of computing devices belonging to a user and connected to a network, where a first computing device initiates a first working session with a server computing device creating a first work environment on the first computing device and at initiation the user migrating the first session to a second computing device to continue the first working session between a second computing device and a server computing device. The method is performed by initiating a first working session between a first computing device and a server (a) determining all non-failure states of each component of the first work environment goes through based on the non-failure action performed on it; (b) for each determined state determining all failure events caused by events that prevent said each component from reaching said non-failure states; (c) associating said failure events with one of defined failure states; (d) for each failure state specifying a next non-failure action to perform; (e) repeating steps (a)-(d) for all next non-failure action of step (3); and initiating migration of the first session to a second computing device to continue the first working session between a second computing device and a server computing device.

BRIEF DESCRIPTION OF THE DRAWINGS

The foregoing and other objects, aspects, and advantages of the present invention will be better understood from the following detailed description of preferred embodiments of the invention with reference to the accompanying drawings that include the following:

FIG. 1 is a block diagram showing a scenario where purchasing information is being migrated from a computing device at work to a computing device at home of a user; and FIG. 2 is a migration state diagram illustrating various stages in the inventive system of migrating information from one or more servers to multiple client devices.

DETAILED DESCRIPTION OF THE INVENTION

The present invention uses an approach that is based on state-machines for handling migration of business processes and context from device to device and from device to server for bootstrapping purposes. A simple configuration of mobile devices connected to the Internet and to a collection of pre-selected set of commerce servers is being considered. Each device has capabilities to support local database systems, e.g., Embedded Database System DB2e from IBM, local file system, messaging system, run-time support for programming, e.g., Java based run-time, and administration applications. The following are the two main entities considered in the inventive design of the overall architecture.

Mobile Device

In their present architecture the mobile devices are capable of browsing eXtensible Markup Language (XML), Hyper Text Markup Language (HTML) or Wireless Markup Language (WML) and Hand Held Device Markup Language (HDML) forms/data. The devices are connected to local wireless local area networks (LANs) such as Institute of Electrical & Electronics Engineers (IEEE) standard 802.11b, through mobile modems, or via mobile providers who support wireless gateways. The assumptions are that each user has one or more devices, with each device supporting an operating system, such as PALM, windows compact edition (WinCE), Linux, to enable rapid deployment of applications over the local embedded database system, messaging system and run-time environments.

E-business Server

The e-business server is a web-application server, which supports a Java 2 Enterprise Edition (J2EE), sold by Sun corporation, based enterprise architecture, and handles bootstrapping protocols for handling multiple devices. Requests sent to the server are handled by serylets, as described in Sairamesh 1 and Dhiraj K. Pradhan et al., "Recoverable Mobile Environment: Design and Trade-Off Analysis," International Symposium on Fault-Tolerant Computing (FTCS) 1996: 16-25, which parse the device context, and handle the incoming requests. The server authenticates mobile users based on their profile and other information.

FIG. 2 illustrates a state-machine for performing a business process such a that described in connection with FIG. 1, where the business process is migrating on the client devices 26-28 (FIG. 1). Prior to the execution of the migration state machine, the following process steps are performed:

1) An object's life cycle states are determined and specified, e.g., all possible non-failure states that an object goes through based on the non-failure action performed on it. For example, the distinct states required for transferring a shopping cart object of the tire purchasing process discussed above. In the given example these states include migrating 40, drafting, 42, authorizing 44, pending 46, completing 48, canceling 50, and done or exiting 52 states.

2) For each determined states, listing all possible failures, e.g., power failure, network disconnect, resource (disk) insufficiency, disk failure, etc., and associating these failures with one of the defined failure states, in the given example these defined states include authorization 54, migration 56, and cancellation 58.

3) For each of the existing failure states 54-58, specifying what action to perform if such failure occurred. The specified action will perform steps necessary to recover from the failure condition.

4) Repeating steps (1)-(3) for each action of step (3).

The process 60 can be executed on any device that is performing a migration and exists on the server side 24 for the order process. The original process without disconnection consists of only five states 42-50. When the migration process 60 begins, it is in a draft state 42, i.e., placed in the shopping cart of the purchasing system. Then it moves from state to state depending on the stage of the purchasing process. The following are the possible states the application process for order can go into without considering the disconnection and other failure conditions: Draft 42; Authorizing 44; Pending 46; Complete 48; and Cancelled 50.

The user of the mobile device may be processing one or more orders when disconnected. The orders submitted from the device may be in any of the five states. However, due to network disconnection, timeouts, and failures, additional states represent the state of the order and the appropriate failure condition. The disconnected states are as follows: Failure Authorization 54; Failure Cancellation 58; and Failure Migration 56. When the network 18 (FIG. 1) is disconnected, the process for handling migration of business processes and context moves to one of these disconnected or failure states.

Architecture for Migration and Disconnection is described below with some of the design criteria for developing a "light weight" client middleware for enabling e-business and computing applications to run in all kinds of potential modes. There are many design criteria to consider when developing and deploying an end-to-end solution for mobile commerce on clients and servers. The core design criteria for a simple middleware framework for e-business applications on mobile clients is discussed herein. The clients could be PDAs, PocketPCs, wireless laptops, and other mobile devices. The framework includes:

Mechanism for handling disconnection, failures, resource constraints, such as low memory or low battery or network bandwidth, and providing the application user to access and perform business activities in seamless fashion.

Event management to handle all kinds of system failures, network disconnections, low battery, resource limits, and others.

Self-management: A process engine to drive the business processes on the client side for various object instances and process instances. For example, in the business scenario above, a process engine drives the order process based on the defined state-machine.

Authentication and session management: the client and server handle mobile sessions similar to regular web-browsers for some applications. Session management is done through cookies, which have to be set by the servers in the responses, and conforming to the URL encoded schemes. The clients have to maintain session information for interaction with the servers.

FIG. 3 illustrates architecture of the client device, which includes the following components:

Migration Engine

The main component for migration of business processes is a migration engine that ensures that the business process instances and contextual data is migrated from the device to another available (and registered) device in the network. The migration engine also plays a role in receiving business process instances from various clients in the network that are used by the business user.

Persistence and messaging: The first component is the database system, which is a reduced functionality embedded relational database system like DB2e. The second component is the messaging component to handle in-bound and out-bound messaging in a reliable fashion.

Run-time engine: The most important component is the run-time of the e-business framework. This run-time engine handles the following:

1. persistence of business objects in the local embedded relational database;
2. a process engine to handle all business processes, interactions and all kinds of events (including failure events);
3. a set of recovery mechanisms which are run "automatically" to enable the application process state to move from disconnected to connected states and final completion of the process.

Self-management: The run-time engine through event management can handle all kinds of failure events as long as they are captured and put in an event queue. In addition, the engine can self-recover the processes that are in disconnected or failure states by performing simple recovery procedures.

Each mobile device may has a local database system 104, a messaging component such as a the IBM's MQe 106, a Java run-time engine, for example a J9 JVM from IBM, the J2ME framework, and a collection of XML and User Interface libraries. In an exemplary configuration, the mobile devices, such as PALM and WinCE based devices may be connected to the Internet via wireless Ethernet cards enabled with 802.11b protocols. A base-station provides the link between the wireless device and the wired LAN. In this configuration, a request from a mobile client is sent directly via reliable messaging or direct synchronous TCP/IP connections to the commerce server, such as an IBM product WCS BE for e-business applications.

Additional references used in designing the present invention include A. Tsalgatidou et al., "Challenges in Mobile Electronic Commerce", proceedings of the IeC 2000, $3^{rd}$ Int. Conf. On Innovation through E-commerce. Manchester, UK, Nov. 14-16, 2000. Peter Muth et al., "From Centralized Workflow Specification to Distributed Workflow Execution," Journal of Intelligent Information Systems, 10(2): 159-184 (1998). D. Georgakopoulos et al., "An Overview of Workflow Management: From Process Modeling to Workflow Automation Infrastructure", Journal of Parallel and Distributed Systems, 1995. G. Alonso et al., "Exotica/FMDC: A Workflow Management System for Mobile and Disconnected Clients," Journal of Distributed and Parallel Databases, 1996. A. Jhingran, "Moving up the food chain: Supporting E-Commerce Applications on Databases," SIGMOD Record 29(4): 50-54 (2000). Douglas B. Terry et al., "Managing Update Conflicts in Bayou, a Weakly Connected Replicated Storage System, "Symposium on Operating Systems Principles (SOSP) 1995: 172-183. Brian Noble et al., "Agile Application-Aware Adaptation for Mobility," Symposium on Operating Systems Principles (SOSP) 1997: 276-287. Prabhu Ram et al., "Distributed Transactions in Practice," SIGMOD Record, 1999.

While the invention has been shown and described with reference to certain preferred embodiments thereof, it will be understood by those skilled in the art that various changes in form and details may be made therein without departing from the spirit and scope of the invention as defined by the appended claims.

The invention claimed is:

1. A method for seamless migration of one or more business processes and their work environment between a plurality of computing devices belonging to a user and connected to a network, where a first computing device initiates a first working session with a server computing device creating a first work environment on the first computing device and at initiation the user migrating the first session to a second computing device to continue the first working session between a second computing device and a server computing device, the method comprising steps of:
   (a) determining all non-failure states of each component of the first work environment goes through based on the non-failure action performed on it;
   (b) for each determined state determining all failure events caused by events that prevent said each component from reaching said non-failure states;
   (c) associating said failure events with one of defined failure states;
   (d) for each failure state specifying a next non-failure action to perform;
   (e) repeating steps (a)-(d) for all next non-failure action of step (d); and
   (f) migrating said one or more business process and their work environment between a plurality of computing devices belonging to the user.

2. The method of claim 1, wherein the network is the Internet.

3. The method of claim 1, wherein the computing devices are connected to the network via wireless means.

4. The method of claim 1, wherein the computing devices are connected to the network via wired and wireless means.

5. The method of claim 1, wherein the migrating of one or more business processes and their work environment between a plurality of computing devices provides transparency and reliability to the user utilizing the plurality of computing devices.

6. The method of claim 1, wherein users and their plurality of computing devices are registered with the sewer computing device.

7. The method of claim 1, wherein instances of migrations are registered with the server computing device.

8. A computer program device readable by a machine, tangibly embodied in a storage medium and in a manner so as to be executable by the machine to perform method steps for a method for seamless migration of one or more business processes and their work environment between a plurality of computing devices belonging to a user and connected to a network, where a first computing device initiates a first working session with a sewer computing device creating a first work environment on the first computing device and at initiation the user migrating the first session to a second computing device to continue the first working session between a second computing device and a sewer computing device, the method comprising steps of:
   (a) determining all non-failure states of each component of the first work environment goes through based on the non-failure action performed on it;
   (b) for each determined state determining all failure events caused by events that prevent said each component from reaching said non-failure states;
   (c) associating said failure events with one of defined failure states;
   (d) for each failure state specifying a next non-failure action to perform;
   (e) repeating steps (a)-(d) for all next non-failure action of step (d); and
   (f) migrating said one or more business process and their work environment between a plurality of computing devices belonging to the user.

9. A method for seamless migration of one or more business processes and their work environment between a plurality of computing devices belonging to a user and connected to a network, the method comprising steps of:
   (a) initiating a first working session between a first computing device and a server computing device, wherein a first work environment is created on the first computing device;
   (b) determining all non-failure states of each component of the first work environment goes through based on the non-failure action performed on it;
   (c) for each determined state determining all failure events caused by events that prevent said each component from reaching said non-failure states;
   (d) associating said failure events with one of defined failure states;
   (e) for each failure state specifying a next non-failure action to perform;
   (f) repeating steps (a)-(d) for all next non-failure action of step (d); and
   (g) initiating migration of the first session to a second computing device to continue the first working session between a second computing device and a server computing device.

10. The method of claim 9, wherein the computing devices are wirelessly connected to the network.

\* \* \* \* \*